(12) United States Patent
Chao et al.

(10) Patent No.: US 9,046,631 B2
(45) Date of Patent: Jun. 2, 2015

(54) LIGHT GUIDING PLATE AND LIGHT GUIDING DEVICE INCLUDING THE SAME

(71) Applicant: INDUSTRIAL TECHNOLOGY RESEARCH INSTITUTE, Chu-Tung, Hsinchu (TW)

(72) Inventors: Chih-Chiang Chao, New Taipei (TW); Po-Ling Shiao, Hsinchu (TW); Mei-Chun Lai, Zhubei (TW)

(73) Assignee: Industrial Technology Research Instiute, Hsinchu (TW)

( * ) Notice: Subject to any disclaimer, the term of this patent is extended or adjusted under 35 U.S.C. 154(b) by 42 days.

(21) Appl. No.: 14/097,980

(22) Filed: Dec. 5, 2013

(65) Prior Publication Data
US 2015/0016148 A1 Jan. 15, 2015

(30) Foreign Application Priority Data
Jul. 10, 2013 (TW) .............................. 102124809 A

(51) Int. Cl.
*F21V 8/00* (2006.01)
(52) U.S. Cl.
CPC ............ *G02B 6/0036* (2013.01); *G02B 6/0065* (2013.01)

(58) Field of Classification Search
CPC ..................................................... G02B 6/0043
See application file for complete search history.

(56) References Cited

U.S. PATENT DOCUMENTS

2011/0199783 A1* 8/2011 Shih et al. .................... 362/606

FOREIGN PATENT DOCUMENTS

| JP | 2008-003606 A | 1/2008 |
|----|----|----|
| JP | 2008-003606 A | 12/2012 |

\* cited by examiner

*Primary Examiner* — Mary Ellen Bowman
(74) *Attorney, Agent, or Firm* — Muncy, Geissler, Olds & Lowe, P.C.

(57) ABSTRACT

A light guiding plate and a light guiding device are provided, and the light guiding plate is implemented in the light guiding device. The light guiding device includes a side light source emitting light to the light guiding plate. The light guiding plate includes a first surface, a second surface and a third surface. The second surface is opposite to the first surface, and the third surface is adjacent to the first surface and the second surface. The second surface includes plural light guiding units, and each of the light guiding units includes a total reflection concavity and a light emitting convexity. The light emitting convexity surrounds the total reflection concavity.

25 Claims, 5 Drawing Sheets

LIGHT GUIDING PLATE AND LIGHT GUIDING DEVICE INCLUDING THE SAME

CROSS-REFERENCE TO RELATED APPLICATIONS

This non-provisional application claims priority under 35 U.S.C. §119(a) on Patent Application No(s). 102124809 filed in Taiwan, R.O.C. on Jul. 10, 2013, the entire contents of which are hereby incorporated by reference.

TECHNICAL FIELD

The disclosure relates to a light guiding plate and a light guiding device including the same.

BACKGROUND

With the unceasing development of computer, communication and customer electronic (3C) industry, the display device in the 3C industry becomes more important. The display device in a 3C product usually uses a backlight module or a front light module. The backlight module or the front light module can guide the light emitted by an external light source of the display device, toward a display panel in the display device for image display. For a non-self emissive display device such as a liquid crystal display (LCD) device, it performs the image display by controlling the optical path of light emitted by the external light source, and therefore requires a corresponding backlight module or a corresponding front light module to guide the light toward the display panel. Recently, with the enhancement of the demand of backlight module or front light module in the large-size LCD device, the backlight module or the front light module requires the uniform emitted light more seriously.

The front backlight module generally utilizes a specific light guiding plate which allows ambient light to pass through and then travel to the LCD panel, or guides the light emitted by a side light source at the side of the light guiding plate, to the LCD panel. However, such a light guiding plate has a low efficiency, leading in the large consumption of light energy. Also, after the light is reflected and refracted in the light guiding plate, the light difficultly arrives where is far from the light source in the light guiding plate, so that the display device easily has a dark area that the place where the light does not arrive, has a low brightness. Therefore, the display device will have an uneven light distribution. In order to maintain the desired brightness of light emitted by the light guiding plate, the power of battery supporting the brightness maintaining is required much more, so that the battery for the power needs to be charged very often. Moreover, the guiding structures of most light guiding plates also cause unclear image problems such as the image distortion or the image blurring.

SUMMARY

A light guiding plate according to an embodiment of the disclosure includes a first surface, a second surface and a third surface. The second surface is opposite to the first surface and includes a plurality of light guiding units. Each of the light guiding units includes a total reflection concavity and a light emitting convexity. The light emitting convexity surrounds the total reflection concavity. The third surface is adjacent to the first surface and the second surface and allows light to pass through it. The light is totally reflected by the first surface and the second surface to travel forward along a direction parallel to the first surface and the second surface. The total reflection concavity reflects more than eighty percent of the light, and the light emitting convexity allows more than eighty percent of the light to pass through it.

A light guiding device according to an embodiment of the disclosure includes a side light source configured to emitting light, and a light guiding plate. The light guiding plate includes a first surface, a second surface and a third surface. The second surface is opposite to the first surface and includes a plurality of light guiding units. The third surface is adjacent to the first surface and the second surface and is configured to allow the light to pass through it. Each of the light guiding units includes a total reflection concavity configured to totally reflect more than eighty percent of the light, and a light emitting convexity surrounding the total reflection concavity and allowing more than eighty percent of the light to pass through it. The light passes through the light guiding plate from the third surface of the light guiding plate, and is totally reflected by the first surface and the second surface to travel along a direction parallel to the first surface and the second surface.

BRIEF DESCRIPTION OF THE DRAWINGS

The present disclosure will become more fully understood from the detailed description given herein below for illustration only and thus does not limit the present disclosure, wherein.

DETAILED DESCRIPTION

Figure 1A:
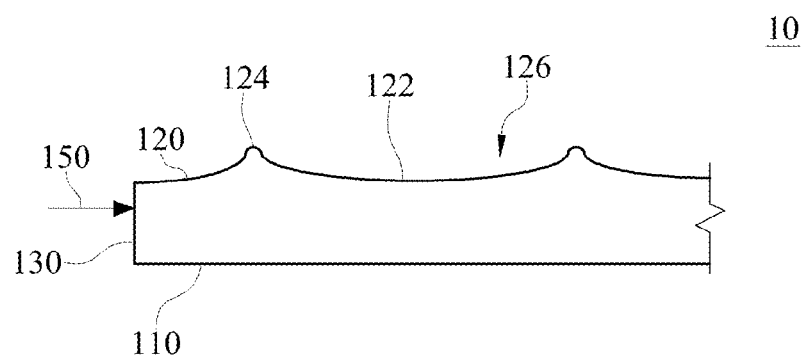
FIG. 1A is a schematic lateral view of a light guiding plate according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Most of liquid crystal display devices belong to a non-emitting light type, which require a backlight module or a front light module for guiding light emitted by a light source, to a display panel, so as to display images. FIG. 1A is a schematic lateral view of a light guiding plate according to an embodiment of the disclosure. A light guiding plate 10 can guide light 150 emitted by an external light source such as a white light emitting diode (LED), to the display panel. The light guiding plate 10 in an example can guide the light 150 coming from one side of the light guiding plate 10, i.e. the left and right sides of the drawing, so that the light 150 can travel forward along a distance parallel to the plane of the drawing according to the total reflection principle, thereby guiding the light 150 to the display panel.

The light guiding plate 10 includes a first surface 110, a second surface 120 and a third surface 130. The second surface 120 is opposite to the first surface 110 and includes a plurality of light guiding units 126. Each light guiding unit 126 includes a total reflection concavity 122 and a light emitting convexity 124. The light emitting convexity 124 surrounds the total reflection concavity 122. The light guiding plate 10 in this or some embodiments can be made of a flexible material. The total reflection concavity 122 and the light emitting convexity 124 in an example are formed by etching the light guiding unit 126 with a laser beam having a high energy, and the height of the total reflection concavity 122 is different from the height of the light emitting convexity 124. In other words, the total reflection concavity 122 and the light emitting convexity 124 cooperate to form each light guiding unit 126.

The third surface 130 is adjacent to the first surface 110 and the second surface 120. The third surface 130 allows the light 150 to pass through it, and then the light 150 is totally reflected by the first surface 110 and the second surface 120 to travel forward along a direction parallel to the first surface 110 and the second surface 120. In this or some embodiments, the total reflection concavity 122 totally reflects more than eighty percent of the light 150, and the light emitting convexity 124 allows more than eighty percent of the light 150 to pass through it. In this or some embodiment, the reflectance of the total reflection concavity 122 corresponding to the light 150 is greater than the reflectance of the light emitting convexity 124 corresponding to the light 150, and the transmittance of the total reflection concavity 122 corresponding to the light 150 is smaller than the transmittance of the light emitting convexity 124 corresponding to the light 150.

The total reflection concavity 122 and the light emitting convexity 124 have a first radius of curvature and a second radius of curvature respectively. The total reflection concavity 122 and the light emitting convexity 124 join each other. Specifically, the total reflection concavity 122 can be divided into a plurality of first segments, and the first sub radius of curvature of each first segment is greater than a first threshold. Similarly, the light emitting convexity 124 can be divided into a plurality of second segments, and the second sub radius of curvature of each second segment is smaller than a second threshold. The first threshold may be different from the second threshold. For example, the first radius of curvature is in a range of 250 μm to 2500 μm, and the second radius of curvature is in a range of 0.5 μm to 5 μm.

A period of the light guiding unit 126 is in a range of 1 to 50 μm or in a range of 1 to 100 μm, a ratio of the depth of the light guiding unit 126 to the width of the light guiding unit 126 is smaller than one tenth. The depth of the light guiding unit 126 is the difference between the top point of the light emitting convexity 124 and the bottom point of the total reflection concavity 122, and the width of the light guiding unit 126 is the sum of the width of the light emitting convexity 124 and the width of the total reflection concavity 122. The difference between the top point of the light emitting convexity 124 and the bottom point of the total reflection concavity 122 in an exemplary embodiment is in a range of 0.1 μm to 5 μm or in a range of 0.1 μm to 10 μm. A ratio of the projected area of the light emitting convexity 124 to the projected area of the total reflection concavity 122 is in a range of 0.1 to 0.25 in an example. The projected area of the total reflection concavity 122 is greater than the projected area of the light emitting convexity 124, and the projected area of the light emitting convexity 124 is smaller than a half of the projected area of the light guiding unit 126. The projected area of the total reflection concavity 122 indicates the area that the total reflection concavity 122 is projected on the plane of the drawing (i.e. the horizontal plane), and the projected area of the light emitting convexity 124 indicates the area that the light emitting convexity 124 is projected on the plane of the drawing, and the projected area of the light guiding unit 126 indicates the area that the light guiding unit 126 is projected on the plane of the drawing. The haze of the light emitting convexity 124 is greater than 1, and the haze of the total reflection concavity 122 is less than 0.5. The light guiding unit 126 in this or some embodiments is a tetragonal close-packed (TCP) structure as shown in FIG. 1D, or is a hexagonal close-packed (HCP) structure as shown in FIG. 1B.

How light is guided by the light guiding plate 10 is illustrated in the following exemplary descriptions. An example in which the total reflection concavity 122 and the light emitting convexity 124 are disposed on the second surface 120 is taken. After the light 150 passes through the third surface 130, the light 150 is totally reflected by the first surface 110 and the second surface 120 to travel forward along a direction parallel to the first surface 110 and the second surface 120. When a part of the light 150 travels to the total reflection concavity 122, this part of the light 150 will be reflected by the total reflection concavity 122. Herein, this reflected part of the light 150 will further be reflected by a light reflector (not shown) disposed on the first surface 110, to successively travel in the light guiding plate 10. Subsequently, this reflected part of the light 150 will be repeatedly reflected until this part of the light 150 travels to the light emitting convexity 124. Finally, this part of the light 150 can pass through the light emitting convexity 124 to be emitted out of the light guiding plate 10. In this way, the light 150 can be guided to pass through the light guiding plate 10.

Similarly, if the total reflection concavity 122 and the light emitting convexity 124 are disposed on the first surface 110, the light 150 can also be guided through a light reflector disposed on the first surface 110, to be emitted out of the light guiding plate 10 in the same way.

Figure 1B:
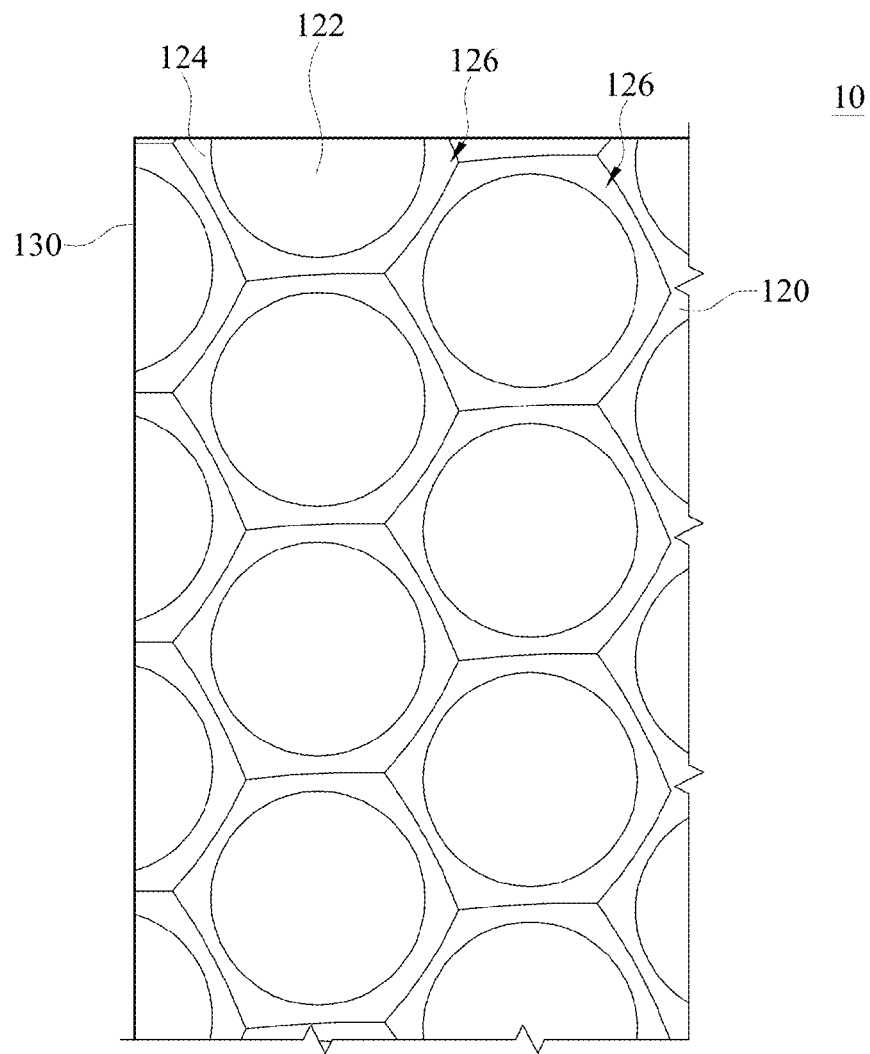
FIG. 1B is a schematic top view of the light guiding plate according to an embodiment of the disclosure.
Figure 1C:
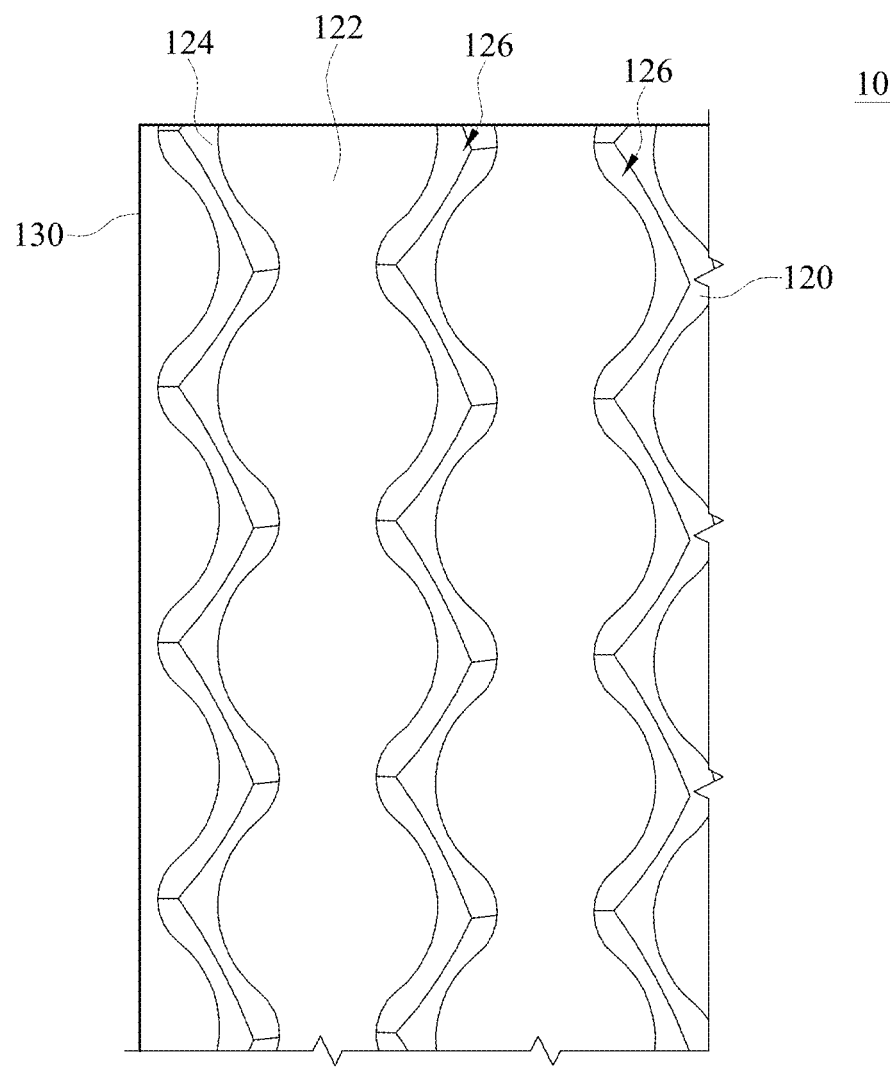
FIG. 1C is a schematic top view of the light guiding plate according to an embodiment of the disclosure.
Figure 1D:
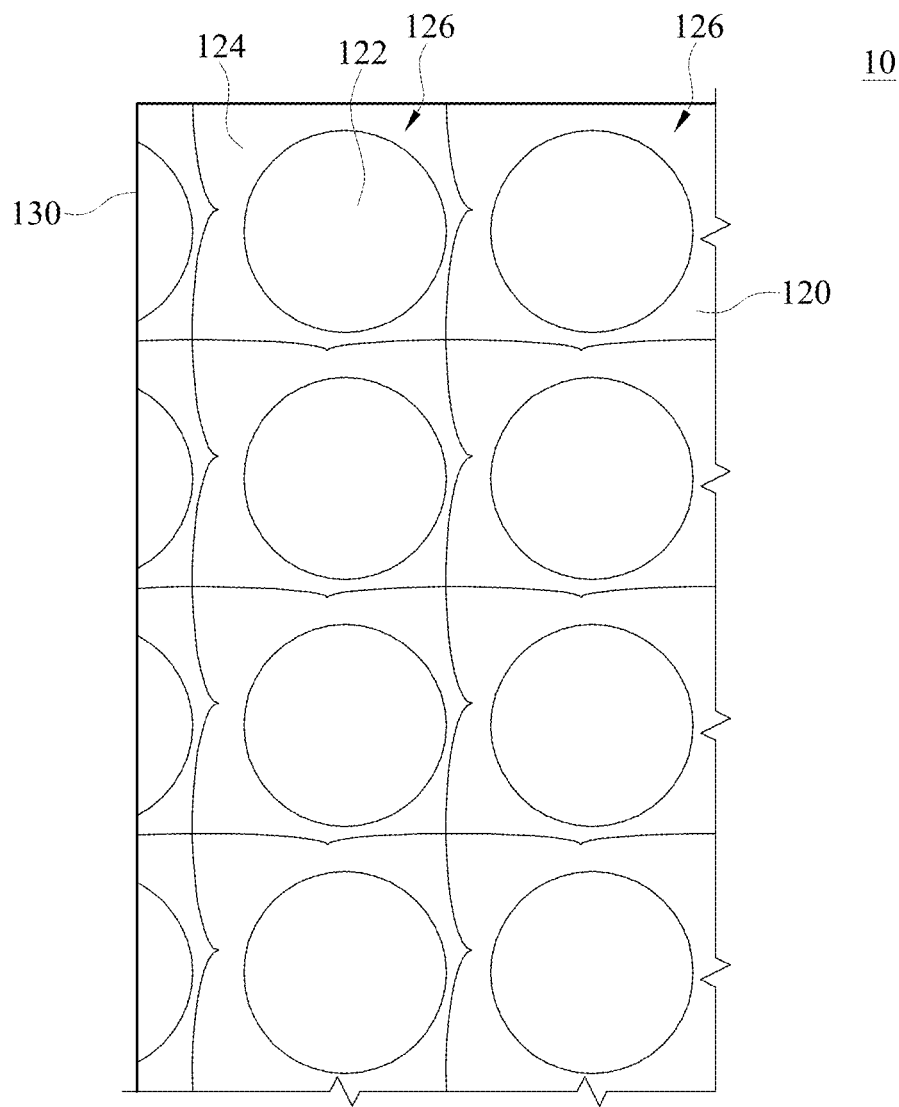
FIG. 1D is a schematic top view of the light guiding plate according to an embodiment of the disclosure.

FIG. 1B is a schematic top view of the light guiding plate according to an embodiment of the disclosure, and presents the light guiding units 126 in the second surface 120. Each of the light guiding units 126 includes a total reflection concavity 122 and a light emitting convexity 124. The light emitting convexity 124 surrounds the total reflection concavity 122. The light guiding unit 126 can be, for example, a HCP structure. In an embodiment, the total reflection concavities 122 in the light guiding plate 10 do not overlap each other or join to each other as shown in FIG. 1B. In an embodiment, the total reflection concavities 122 overlap each other or join to each other as shown in FIG. 1C.

Figure 1E:
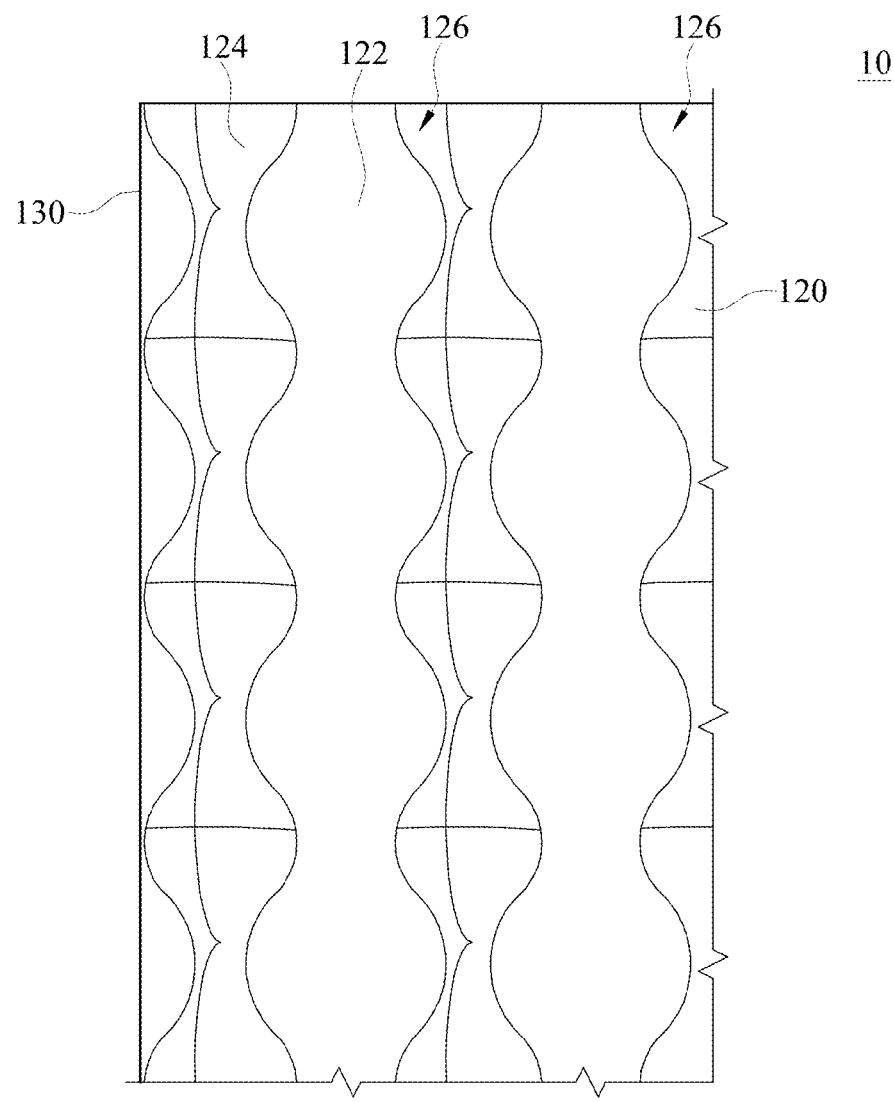
FIG. 1E is a schematic top view of the light guiding plate according to an embodiment of the disclosure.

FIG. 1D is a schematic top view of the light guiding plate according to an embodiment of the disclosure, and presents the light guiding units 126 in the second surface 120. Each of the light guiding units 126 includes a total reflection concavity 122 and a light emitting convexity 124. The light emitting convexity 124 surrounds the total reflection concavity 122. The light guiding unit 126 can be, for example, a TCP structure. In an embodiment, the total reflection concavities 122 in the light guiding plate 10 do not overlap each other or join to each other as shown in FIG. 1D. In an embodiment, the total reflection concavities 122 can overlap each other or join to each other as shown in FIG. 1E.

Figure 2:
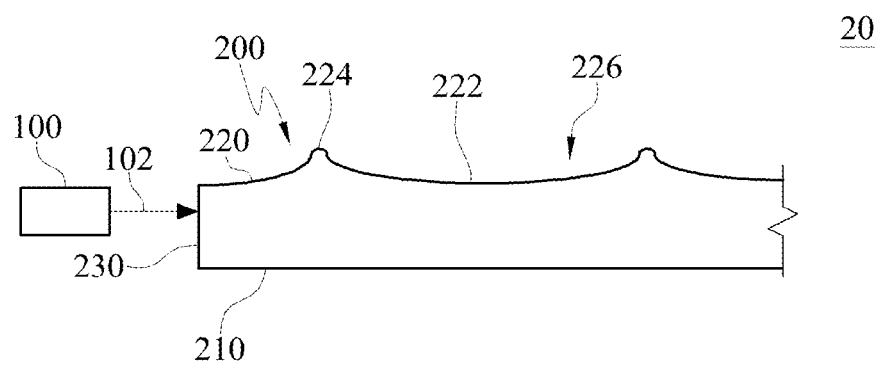
FIG. 2 is a schematic diagram of a light guiding device according to an embodiment.

FIG. 2 is a schematic diagram of a light guiding device according to an embodiment. A light guiding device 20 includes a side light source 100 and a light guiding plate 200 which is the same as the light guiding plate 10. The side light source 100 emits light 102, and the light guiding plate 200 includes a first surface 210, a second surface 220 and a third surface 230. The light 102 gets into the light guiding plate 200 from the third surface 230. The side light source 100 is, for example, a white LED, and the light guiding plate 200 is made of, for example, a flexible material.

The second surface 220 is opposite to the first surface 210, and the second surface 220 includes a plurality of light guiding units 226. Each of the light guiding units 226 includes a total reflection concavity 222 and a light emitting convexity 224. The light emitting convexity 224 surrounds the total reflection concavity 222. The third surface 230 is adjacent to the first surface 210 and the second surface 220, and the third surface 230 allows light 102 to pass through it. The light 102 is totally reflected by the first surface 210 and the second surface 220 to travel forward along a direction parallel to the first surface 210 and the second surface 220. In this or some embodiments, the light 102 is emitted by a white LED. As the same as the light guiding plate 10, the total reflection concavity 222 totally reflects more than eighty percent of the light 102, and the light emitting convexity 224 allows more than eighty percent of the light 102 to pass through it. Specifically, the reflectance of the total reflection concavity 222 corresponding to the light 102 is greater than the reflectance of the light emitting convexity 224 corresponding to the light 102, and the transmittance of the total reflection concavity 222 corresponding to the light 102 is smaller than the transmittance of the light emitting convexity 224 corresponding to the light 102.

The total reflection concavity 222 has a first radius of curvature, and the light emitting convexity 224 has a second radius of curvature, and the first radius of curvature and the second radius of curvature join each other. Specifically, the total reflection concavity 222 can be divided into a plurality of first segments whose first sub radius of curvature is greater than a first threshold. Similarly, the light emitting convexity 224 can be divided into a plurality of second segments whose second sub radius of curvature is less than a second threshold. The first threshold is different from the second threshold. The first radius of curvature is, for example, in a range of 250 μm to 2500 μm, and the second radius of curvature is, for example, in a range of 0.5 μm to 5 μm.

A period of the light guiding unit 226 is, for example, in a range of 1 to 50 μm or in a range of 1 to 100 μm, a ratio of the depth of the light guiding unit 226 to the width of the light guiding unit 226 is, for example, smaller than one tenth. The depth of the light guiding unit 226 is a difference between the top point of the light emitting convexity 224 and the bottom point of the total reflection concavity 222, and is, for example, in a range of 0.1 μm to 5 μm or in a range of 0.1 μm to 10 μm. The width of the light guiding unit 226 is a sum of the widths of the light emitting convexity 224 and the total reflection concavity 222. A ratio of a projected area of the light emitting convexity 224 to a projected area of the total reflection concavity 222 is, for example, in a range of 0.1 to 0.25. Specifically, in an example, the projected area of the total reflection concavity 222 is greater than the projected area of the light emitting convexity 224, and the projected area of the light emitting convexity 224 is smaller than a half of the projected area of the light guiding unit 226. The haze of the light emitting convexity 224 is smaller than 1, and the haze of the total reflection concavity 222 is smaller than 0.5. In this or some embodiments, the light guiding unit 226 is a TCP structure as shown in FIG. 1D, or is a HCP structure as shown in FIG. 1B.

The traveling manner that the light 102 passes through the light guiding plate 200 in the light guiding device 20 after the side light source 100 emits the light 102 to the light guiding plate 200, is similar to the traveling manner that the light 150 passes through the light guiding plate 10 in FIG. 1A, and will not be described again herein.

Figure 3A:
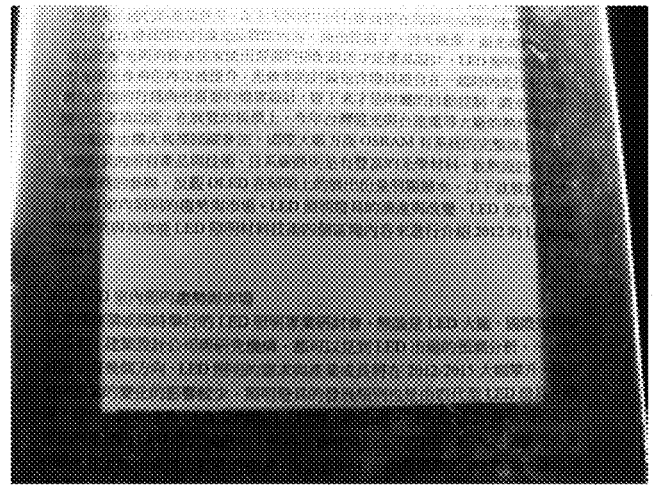
FIG. 3A and FIG. 3B are schematic applied diagrams of the light guiding device in FIG. 2.
Figure 3B:
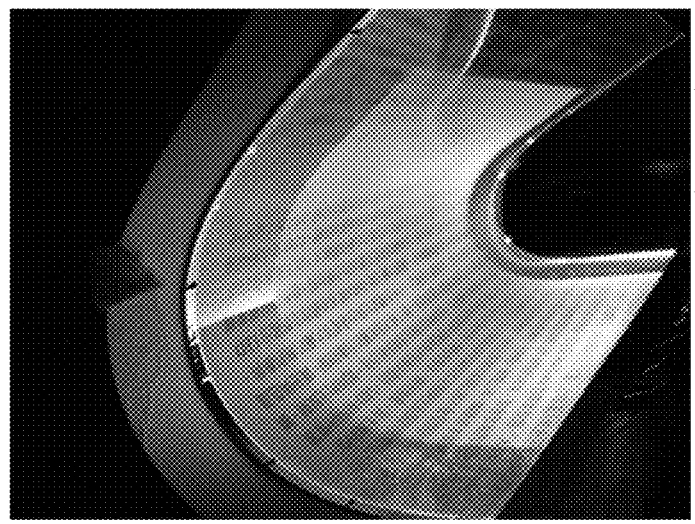

FIG. 3A and FIG. 3B are schematic applied diagrams of the light guiding device in FIG. 2. After the light, i.e. the light 105 in FIG. 1A or the light 102 in FIG. 2, gets into the light guiding plate, i.e. the light guiding plate 10 or 200, from the third surface, i.e. the third surface 130 or 230. The disclosure can be applied in two environments, one is a bright field caused by the turned-on environmental backlight source, and the other one is a dark field caused by the turned-off environmental backlight source. No matter the light guiding plate 10 in FIG. 1A and the light guiding plate 200 in FIG. 2 are curved or flat, the light guiding plates 10 and 200 can respectively guide the light 150 and 102, whereby the displayed images may have a better uniformity of light distribution and be more clear.

In view of the aforementioned embodiments, an exemplary experiment is taken on four light guiding plates A, B, C and D made of polycarbonate (PC) based on various exposure time of laser light. Assume that the laser energy is 150 mJ, that the exposure time of the light guiding plate A is 1 s/mm, that the exposure time of the light guiding plate B is 0.6 s/mm, that the exposure time of the light guiding plate C is 0.5 s/mm, and that the exposure time of the light guiding plate D is 0.3 s/mm. The experimental results of the light guiding plates A, B, C and D are listed in Table 1 as follows.

TABLE 1

| Light guiding plate | Illumination (lux) | Roughness (nm) | Haze (%) | Transmittance (%) |
| --- | --- | --- | --- | --- |
| A | 187.66 | 0.645 | 31.58 | 83.18 |
| B | 160.66 | 0.539 | 26.66 | 83.93 |
| C | 90.3 | 0.379 | 14.89 | 84.02 |
| D | 155 | 0.547 | 25.77 | 84.36 |

From the experimental results, the light guiding plate A has the greatest illumination, its roughness is 0.645 nm, and its haze is 31.58%. The transmittances of the light guiding plates A, B, C and D are in a range of 83% to 85%. Accordingly, the light guiding plate 10 in FIG. 1A and the light guiding plate 200 in FIG. 2 may guide the light 150 and the light 102 efficiently, and the displayed image therefore may have more uniform light distribution.

In the disclosure, the light guiding plate includes the light guiding unit in which the light emitting convexity surrounds the total reflection concavity, so that the greater transmittance of light guiding plate corresponding to the external light may be increased and the display device may have the better emission distribution to display images more clearly.

What is claimed is:
1. A light guiding plate, comprising:
   a first surface;
   a second surface being opposite to the first surface and comprising a plurality of light guiding units, and each of the light guiding units comprising:
      a total reflection concavity configured to totally reflect more than eighty percent of the light; and
      a light emitting convexity surrounding the total reflection concavity and allowing more than eighty percent of the light to pass through it; and
   a third surface being adjacent to the first surface and the second surface and being configured to allow the light to pass through it, wherein the light is totally reflected by the first surface and the second surface to travel along a direction parallel to the first surface.

2. The light guiding plate according to claim 1, wherein a reflectance of the total reflection concavity corresponding to the light is greater than a reflectance of the light emitting convexity corresponding to the light.

3. The light guiding plate according to claim 2, wherein a transmittance of the total reflection concavity corresponding to the light is smaller than a transmittance of the light emitting convexity corresponding to the light.

4. The light guiding plate according to claim 1, wherein the total reflection concavity has a first radius of curvature, the light emitting convexity has a second radius of curvature, and the first radius of curvature and the second radius of curvature join each other.

5. The light guiding plate according to claim 4, wherein the first radius of curvature is in a range of 250 μm to 2500 μm, the second radius of curvature is in a range of 0.5 μm to 5 μum.

6. The light guiding plate according to claim 1, wherein a period of the light guiding unit is in a range of 1 to 100 μm.

7. The light guiding plate according to claim 1, wherein a ratio of a death of the light guiding unit to a width of the light guiding unit is less than one tenth.

8. The light guiding plate according to claim 1, wherein a difference between a top point of the light emitting convexity and a bottom point of the total reflection concavity is in a range of 0.1 μm to 10 μm.

9. The light guiding plate according to claim 1, wherein a ratio of a projected area of the light emitting convexity to a projected area of the total reflection concavity is in a range of 0.1 to 0.25.

10. The light guiding plate according to claim 1, wherein a projected area of the total reflection concavity is greater than a projected area of the light emitting convexity, and the projected area of the light emitting convexity is smaller than a half of a projected area of the light guiding unit.

11. The light guiding plate according to claim 1, wherein a haze of the light emitting convexity is greater than 1, and a haze of the total reflection concavity is smaller than 0.5.

12. The light guiding plate according to claim 1, wherein the light guiding unit is a TCP structure or a HCP structure.

13. A light guiding device, comprising:
a side light source configured to emitting light; and
a light guiding plate, comprising:
  a first surface;
  a second surface being opposite to the first surface and comprising a plurality of light guiding units, and each of the light guiding units comprising:
    a total reflection concavity configured to totally reflect more than eighty percent of the light; and
    a light emitting convexity surrounding the total reflection concavity and allowing more than eighty percent of the light to pass through it; and
  a third surface being adjacent to the first surface and the second surface and being configured to allow the light to pass through it;
wherein the light passes through the light guiding plate from the third surface of the light guiding plate, and is totally reflected by the first surface and the second surface to travel along a direction parallel to the first surface.

14. The light guiding device according to claim 13, wherein the side light source is a white light emitting diode (LED).

15. The light guiding device according to claim 13, wherein a reflectance of the total reflection concavity corresponding to the light is greater than a reflectance of the light emitting convexity corresponding to the light.

16. The light guiding device according to claim 15, wherein a transmittance of the total reflection concavity corresponding to the light is smaller than a transmittance of the light emitting convexity corresponding to the light.

17. The light guiding device according to claim 13, wherein the total reflection concavity has a first radius of curvature, and the light emitting convexity has a second radius of curvature, and the first radius of curvature and the second radius of curvature join each other.

18. The light guiding device according to claim 17, wherein the first radius of curvature is in a range of 250 μm to 2500 μm, and the second radius of curvature is in a range of 0.5 μm to 5 μm.

19. The light guiding device according to claim 13, wherein a period of the light guiding unit is in a range of 1 to 100 μm.

20. The light guiding device according to claim 13, wherein a ratio of a death to a width for the light guiding unit is less than one tenth.

21. The light guiding device according to claim 13, wherein a difference between a top point of the light emitting convexity and a bottom point of the total reflection concavity is in a range of 0.1 μm to 10 μm.

22. The light guiding device according to claim 13, wherein a ratio of a projected area of the light emitting convexity to a projected area of the total reflection concavity is in a range of 0.1 to 0.25.

23. The light guiding device according to claim 13, wherein a projected area of the total reflection concavity is greater than a projected area of the light emitting convexity, and the projected area of the light emitting convexity is smaller than a half of a projected area of the light guiding unit.

24. The light guiding device according to claim 13, wherein a haze of the light emitting convexity is greater than 1, and a haze of the total reflection concavity is less than 0.5.

25. The light guiding device according to claim 13, wherein the light guiding unit is a TCP structure or a HCP structure.

* * * * *